Aug. 7, 1934.　　　　W. B. CHASE　　　　1,969,394
MEANS FOR FACILITATING THE CUTTING OF LAMINATED GLASS
Filed Aug. 24, 1929　　2 Sheets-Sheet 1
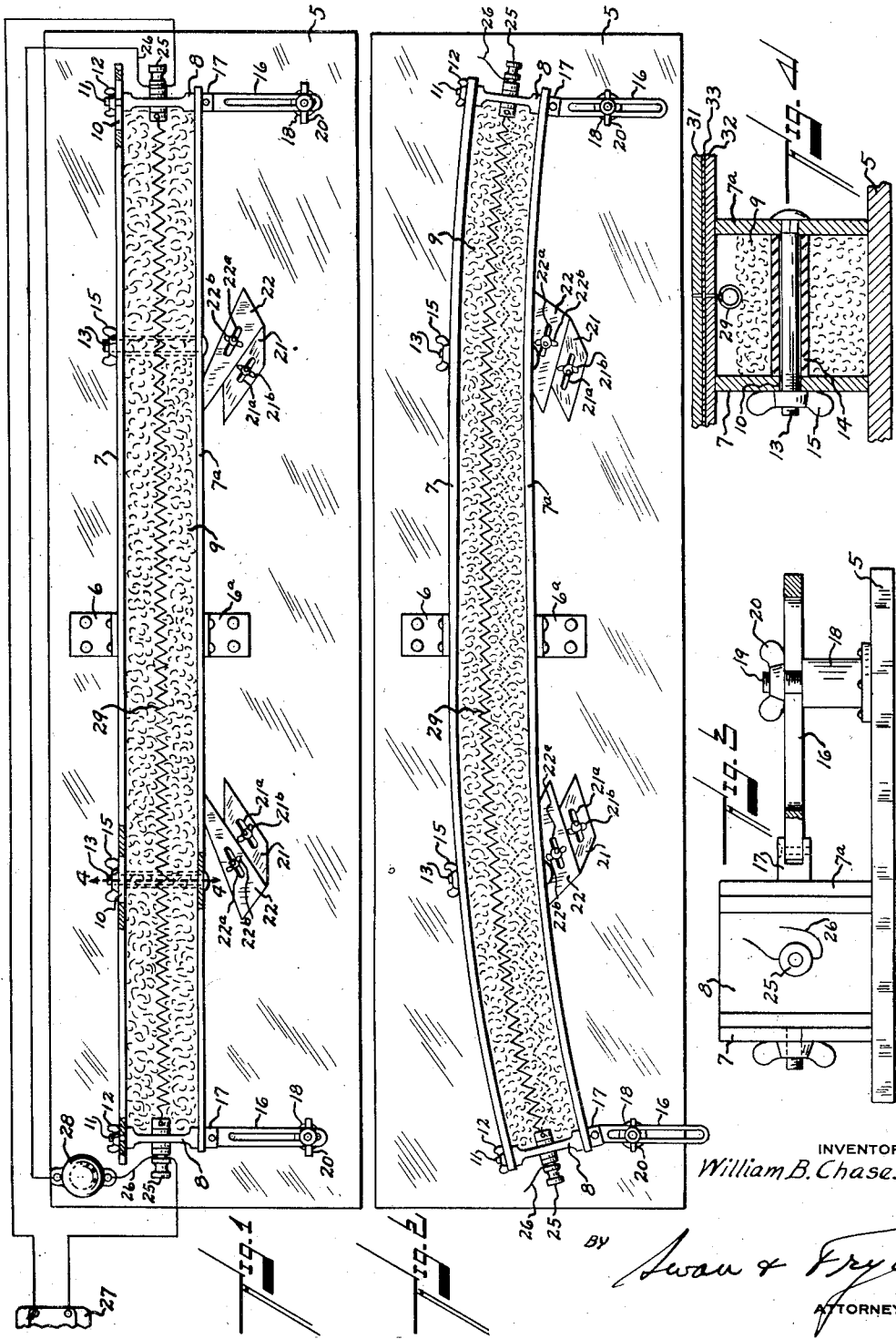
INVENTOR
William B. Chase.
BY
Swan & Frye
ATTORNEYS Aug. 7, 1934.  W. B. CHASE  1,969,394
MEANS FOR FACILITATING THE CUTTING OF LAMINATED GLASS
Filed Aug. 24, 1929  2 Sheets—Sheet 2
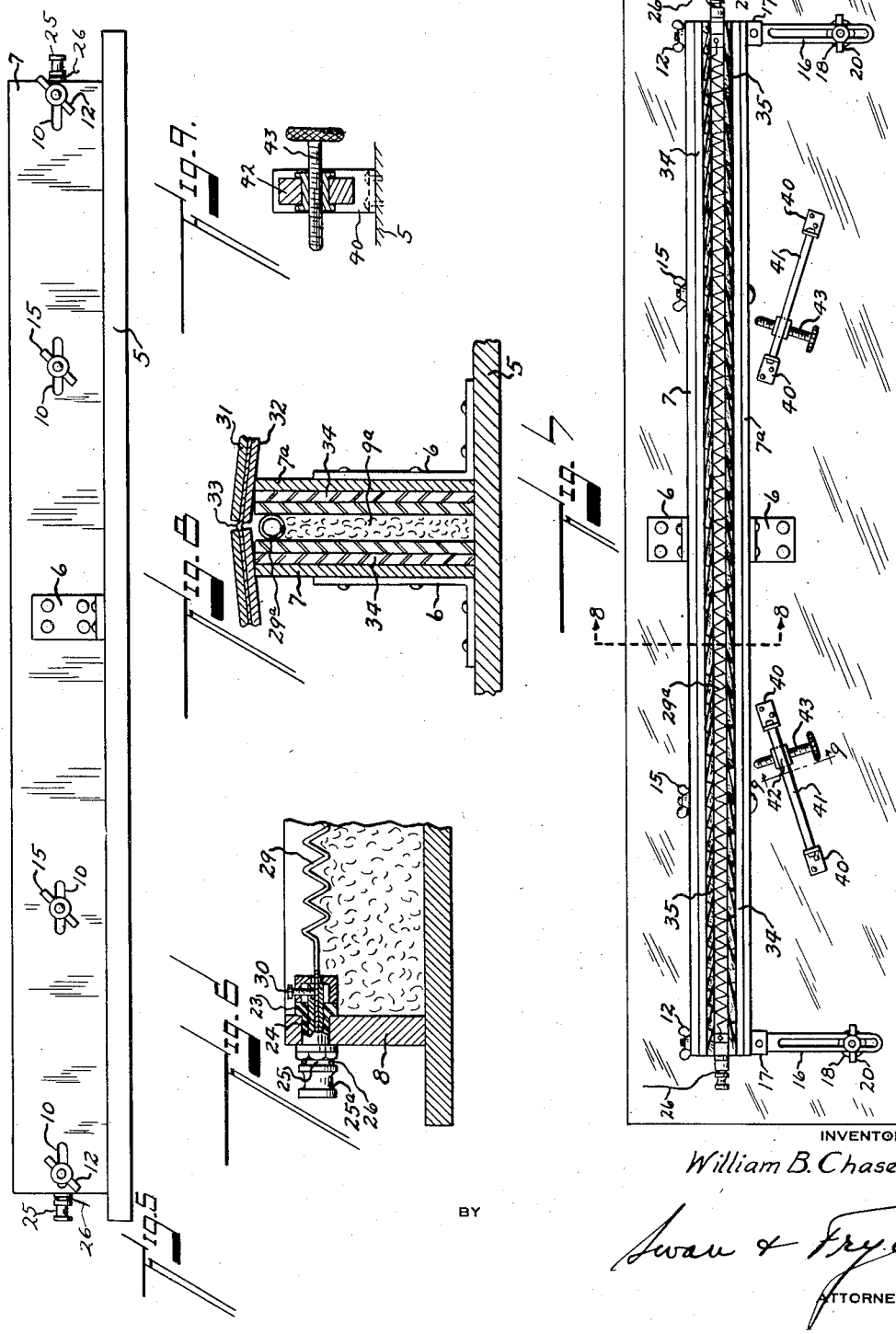
INVENTOR
William B. Chase.

Patented Aug. 7, 1934

1,969,394

UNITED STATES PATENT OFFICE 1,969,394

MEANS FOR FACILITATING THE CUTTING OF LAMINATED GLASS

William B. Chase, Detroit, Mich.

Application August 24, 1929, Serial No. 388,155

10 Claims. (Cl. 49—50)

This invention relates to means for facilitating the cutting of laminated glass, such as is used in automobile windshields and other suitable places.

One of the objects of this invention is the provision of means whereby the central transparent layer spacing two or more glass sheets may be conveniently softened preparatory to cutting or breaking on a desired line. The central transparent layer is usually of celluloid, or similar material, and cannot conveniently be cut with the usual glass cutter. Moreover, if attempt is made to sever it by vibrating the sections on opposite sides of a cut preliminarily made through the outer glass layers the central layer usually separates from the outer glass layers in a noticeable manner disfiguring the edges of the laminated glass adjacent the cut. Through the use of the present means the central layer may be prepared by softening so that it can conveniently be severed by vibrating without separating from the adjacent glass portions, or after treatment may be conveniently cut through with a sharpened tool.

Another object of the present invention is the arrangement of means for softening the central layer of laminated glass on a curved line.

A further object of this invention is the arrangement of means for supporting sections of laminated glass adjacent a cut preliminarily made through the outer glass portions of the laminated glass and supplying intense heat at the cut to thereby soften the central layer of laminated glass, with provisions for shaping the supporting and heat-supplying means to any desired curvature.

Other objects and advantages will be apparent from the accompanying drawings illustrating preferred embodiments of my invention and wherein similar reference characters designate similar parts throughout the several views.

In the drawings:

Figure 1 is a plan view of my improved means for facilitating the cutting of laminated glass, the heat-supplying means being arranged in a substantially straight line.

Figure 2 is a similar view with the supporting means and heat-supplying means curved away from the positions shown in Figure 1.

Figure 3 is an end view taken substantially from the left of Figure 2.

Figure 4 is a detail cross section taken substantially on the line 4—4 of Figure 1 and showing a piece of laminated glass in position for treatment.

Figure 5 is a rear elevation.

Figure 6 is a detail longitudinal section taken substantially on the line 6—6 of Figure 1.

Figure 7 is a plan view similar to Figure 1 of a modified embodiment of my invention, and Figure 8 is an enlarged cross section taken substantially on the line 8—8 of Figure 7.

Figure 9 is a side view taken substantially along the line 9—9 of Fig. 7.

Referring now to the drawings, numeral 5 designates a base plate which may be suitably mounted upon a table or framework at a convenient height for use of my improved apparatus by the workmen. Substantially centrally of the base board 5 is arranged a pair of spaced opposed brackets 6 and 6ª to which are respectively secured the central portions of a pair of flexible metallic side members 7 and 7ª. Between the ends of the side members 7, 7ª are arranged a pair of metallic end plates 8 and the side members 7 and end plates 8 form an enclosure wherein is contained a mass of comminuted heat insulating material 9, such for example as asbestos wool. This enclosure may be flexed away from the rectangular position shown in Figure 1 to assume any desired arcuate form, such as for example is shown in Figure 2, wherein that portion of the enclosure to the left of the brackets 6, 6ª is bent to a greater extent than the portion at the right of the brackets. To facilitate this flexing of the side members 7, 7ª I preferably provide a plurality of slots 10 in the rear plate 7 arranged longitudinally of the plate at spaced intervals. Thus for example, slots 10 may be arranged adjacent the end plates 8 with bolts 11 extending from the end plates through the slots and cooperating with wing nuts 12, as hereinafter pointed out. Intermediate the end plates and the brackets 6, 6ª are preferably arranged a plurality of spaced stiffening bolts 13 (note Figure 4), the heads of which are preferably squared to fit into square apertures in the side members 7ª, and the central portions of which pass through spaced sleeves 14 which abut at their ends against the inner walls of the plates 7, 7ª to maintain the desired distance between the plates regardless of the shape of the enclosure for the insulating material. The threaded portions of the bolts 13 extend through elongated slots 10 and cooperate with wing nuts 15. Means are also provided adjacent the front plates 7ª for maintaining the enclosure for the heat insulating material 9 in any desired arcuate form. Thus at the ends of the plate 7ª (note Figure 3) are arranged a pair of slotted guide members 16, herein shown as pivotally connected with a bracket 17 secured to the plate 7ª and passing over a post 18 at the upper extremity of which is provided a bolt 19 of lesser diameter than the post, which bolt passes through the slot in the guide portion 16 and cooperates with a wing nut 20 whereby the guide members may be clamped against the larger portion of the post 18 whenever desired. There may also be provided between the brackets 6, 6ª and the guide member 16 a plurality of adjustable stiffening members for abutment with intermediate portions of the plate 7ª. As herein shown I have provided a plurality of adjustable stiffening members each comprising a pair of slotted members 21 and 22 by means of which intermediate portions of the plate 7ª may be abutted by the members 22. The members 21 are provided with elongated slots 21ª through which pass bolts secured in the base plate 5 and cooperating with wing nuts 21ᵇ for clamping the member 21 in any adjusted position. The members 21 act as anchors for the adjustable members 22, which also are provided with elongated slots 22ª through which pass bolts secured in the base plate 5 and cooperating with wing nuts 22ᵇ. By first adjusting the member 21 and then moving the member 22 until it is firmly anchored upon the member 21 it is possible to reinforce the intermediate portions of the plate 7ª in various positions of the plate.

By virtue of the construction hereinabove described I am enabled to swing the enclosure for the heat insulating material 9 to any desired arcuate shape. The wing nuts 12, 15, 18 and 20 are first loosened and the anchor members 21, 22 moved away from the enclosure to an appropriate distance, after which the ends of the enclosure are swung out of line with the bracket 6 to the desired extent. The wing nuts are then tightened up to secure the enclosure in the adjusted position. The anchor members 21 and 22 are adjusted if necessary to force the intermediate portions of the enclosure to assume desired positions.

Through each end plate 8 extends an elongated hollow bushing 23 of insulating material, and through the central opening of the hollow bushing extends a metallic sleeve 24. Mounted upon each bushing 23 exteriorly of its end plate 8 is arranged a terminal post 25 which is electrically connected with the sleeve 24 and carries a thumb nut 25ª whereby the end of a conducting wire 26 may be suitably secured upon the terminal post (note Figure 6). The wires 26 are arranged in a suitable circuit with a source of current, herein shown as a plug 27, which circuit preferably includes a lamp 28 in the usual lamp socket whereby visual indication of the closing of the circuit will be given. While any suitable switch may be used for closing such circuit, I have successfully employed the use of the lamp 28 as the switch, merely unscrewing the lamp 28 within its socket when it is desired to break the circuit. Through the open inner end of the metallic sleeve 24 may be slid the straight end portions of an electrical heating wire 29 extending between the end plates 8 and lying upon the heat insulating material 9. The end portions of the heating wire 29 may be inserted into the sleeves 24 to any desired extent and then clamped in such position by means of set screws 30. Preferably the wire 29 is not tautly stretched between the end plates 8, but is rather loosely arranged therebetween so that the wire can be manually adjusted to assume any desired curvature on its bed of asbestos wool within the enclosure. This permits the bending of the heating wire 29 to assume different curves than the enclosure itself, and by spacing the plate 7, 7ª a sufficient distance apart it is possible to secure practically all useful curvatures utilized in cutting glass, by bending the enclosure and then manually adjusting the wire 29 on the bed of asbestos wool 9 until it is appropriately curved.

In use, the laminated glass to be cut is first scratched with a glass cutter on the exterior faces of the outer glass portions 31 and 32 (note Figure 4), a templet being utilized to guide the glass cutter so that the scratches will be on the desired curvature. Then the exterior glass plates 31 and 32 are tapped or bent slightly to crack these glass faces through to the celluloid central portion 33 of the laminated glass. After this the glass is placed so that it rests upon the sides plates 7, 7ª of the enclosure for the heat insulating material with the cut directly above the wire 29, through which current is passing and which has previously been set in the desired curvature with the templet as a guide. The heat from the wire passes readily through the cracked portions 31, 32 of the laminated glass and softens the celluloid central portion 33. If desired the glass can be heated from first one side and then the other. When the celluloid is softened the central layer 33 can be readily broken through on the desired curve by vibrating the glass back and forth, or if desired, it can be bent to separate the edges of one of the cracked exterior plates and a sharp tool, such for example as a razor blade, inserted and passed along the curve to quickly sever the softened celluloid on the desired curvature. Obviously my apparatus may also be utilized for cutting glass along straight lines, but it is particularly useful in aiding in the cutting on curved lines, which is at present very difficult with laminated glass.

In Figures 7 and 8 is shown a slightly modified embodiment of my invention, wherein the electrical heating wire 29ª is arranged to be bent to a desired arc simultaneously with the side plates 7, 7ª. To accomplish this I have reduced the space between the side plates 7, 7ª and the width of the bed 9ª of comminuted heat insulating material, and have also arranged between the side plates and the electric wire 29ª heat insulating material that will flex simultaneously with the side plates. For example, I have shown herein sheets 34 of asbestos or the like lining the inner walls of the plates 7, 7ª and between the asbestos sheets and the electric wire are arranged overlapping strips 35 of mica or the like, so that the strips will flex and slide one upon the other during the bending movements of the apparatus while offering sufficient resistance to heat transfer to protect the side plates and the operator of the machine. With this arrangement the electric heating wire 29ª is held against lateral movement except with the side plates 7, 7ª and their insulating linings. Similar means for controlling the flexing of the side plates and retaining the apparatus in any desired curvature may be utilized with the embodiment shown in Figures 7 and 8.

However, I have illustrated in Figure 7 another means of forcing the intermediate portions of the enclosure by engagement with the front plate 7ª. Such means comprises a pair of brackets 40 mounted on the baseboard 5 so that one of the brackets is closer to the front plate 7ª than the other. Between the brackets 40 are arranged a pair of spaced parallel rods 41, preferably of rectangular cross section, and between the rods 41 is slidably mounted a traveler plate 42, as by means of grooves in the upper and lower edges of the traveler which tightly engage the bars 41, but which can be slid along the bars when subjected to sufficient pressure. The traveler plate 42 carries an elongated bolt 43 having a rounded rear portion for engagement with the front plate 7ª of the enclosure and a comparatively large handle at the opposite end. In using this control means, the traveler plate 42 is slid along the bars 41 to the desired location, and then the bolt 43 is turned until its rounded end engages the front plate 7ª and then further turning of the bolt will force the intermediate portion of the enclosure to the desired location.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. Means for facilitating the cutting of laminated glass comprising spaced plates for supporting the glass on opposite sides of a preliminary cut made partly through the glass, a bed of heat insulting material arranged between the plates, and heating means arranged above the heat insulating material and below the tops of the plates for softening the uncut portion of the glass above the preliminary cut portion thereof, the plates, bed and heating means being movable to various curvilinear positions.

2. Means for facilitating the cutting of laminated glass, comprising spaced flexible plates for supporting the glass on opposite sides of a preliminary cut made partly through the glass, a bed of heat insulating material arranged between the plates, and electrical heating means resting on the bed of insulating material between the plates and adapted to soften the uncut portion of the glass in line with the preliminary cut portion thereof, the heating means being movable to various curvilinear positions by flexing the plates.

3. Means for facilitating the cutting of laminated glass comprising an enclosure formed of flexible elongated side plates and rigid end plates adjustably connected to the side plates, a bed of heat insulating material enclosed therein, means for securing the central portions of the side plates whereby the end portions of the side plates may be swung out of line with the central portions, means for securing the end portions of the enclosure in any adjusted position, an electrical heating wire mounted in and insulated from the end plates and independently movable to varying positions upon the bed of insulating material, and a circuit for heating the wire whenever desired.

4. Means for facilitating the cutting of laminated glass comprising an enclosure formed of flexible elongated side plates and rigid end plates adjustably connected to the side plates, a bed of heat insulating material enclosed therein, an electric heating wire mounted in and insulated from the end plates and independently movable to varying positions with respect to the enclosing plates, a circuit for heating the wire whenever desired, means for securing the central portion of the enclosure and means whereby the end portions of the enclosure may be swung out of line with the central portion thereof, and guide means carried by the end portions of the enclosure for maintaining the end portions in various adjusted positions.

5. Means for facilitating the cutting of laminated glass comprising an enclosure formed of flexible elongated side plates and rigid end plates adjustably connected to the side plates, a bed of heat insulating material enclosed therein, an electric heating wire mounted within but insulated from the end plates and independently movable to varying positions with respect to the enclosing plates, a circuit for heating the wire whenever desired, means for securing the central portion of the enclosure and means whereby the end portions of the enclosure may be swung out of line with the central portion thereof, guide means carried by the end portions of the enclosure for maintaining the end portions in various adjusted positions, and means for bracing the portions of the enclosure between the ends and central portion thereof to maintain them in various adjusted positions.

6. Means for facilitating the cutting of laminated glass comprising an enclosure formed of flexible elongated side plates and rigid end plates adjustably connected to the side plates, a bed of heat insulating material enclosed therein, an electric heating wire mounted within but insulated from the end plates and movable to varying positions with respect to the enclosing plates, a circuit for heating the wire whenever desired, means for securing the central portion of the enclosure and means whereby the end portions of the enclosure may be swung out of line with the central portion thereof, guide means carried by the end portions of the enclosure for maintaining the end portions in various adjusted positions, one of the side plates being provided with elongated slots, and stiffening bolts mounted in the other of said side plates and extending through the clots of the first mentioned side plate to brace the intermediate portions of the enclosure.

7. Means for facilitating the cutting of laminated glass comprising an enclosure formed of flexible elongated side plates and rigid end plates adjustably connected to the side plates, a bed of heat insulating material enclosed therein, an electric heating wire mounted within and insulated from the end plates and movable to varying positions with respect to the enclosing plates, a circuit for heating the wire whenever desired, means for securing the central portion of the enclosure and means whereby the end portions of the enclosure may be swung out of line with the central portion thereof, and guide means carried by the end portions of the enclosure for maintaining the end portions in various adjusted positions, and adjustable abutments arranged to engage portions of the enclosure between the ends and central portion thereof to limit the movement of such intermediate portions of the enclosure.

8. In a device for facilitating the cutting of laminated glass, an elongated flexible insulating support, a flexible heating element extending along the surface thereof in exposed position, and means for holding the insulating support and heating element in desired curvilinear adjusted positions.

9. In a device for facilitating the cutting of laminated glass, an elongated flexible insulating support, a flexible heating element carried in exposed position thereby and extending therealong, and means for holding the flexible support in various adjusted curvilinear positions.

10. In a device for facilitating the cutting of laminated glass, an elongated flexible insulating support, a flexible heating element carried thereby and extending therealong and exposed throughout its length, and means for holding the flexible support and heating element in various curvilinear adjusted positions.

WILLIAM B. CHASE.